United States Patent [19]
Ichikawa et al.

[11] Patent Number: 6,003,379
[45] Date of Patent: *Dec. 21, 1999

[54] PRESSURE SENSOR DEVICE

[75] Inventors: Junichi Ichikawa; Etsuo Nishimura, both of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/974,683

[22] Filed: Nov. 19, 1997

[30] Foreign Application Priority Data

Jul. 11, 1997 [JP] Japan ..................... 9-186546

[51] Int. Cl.$^6$ ............... G01L 19/04; G01L 7/08
[52] U.S. Cl. ................. 73/708; 73/708; 73/715
[58] Field of Search ............. 73/708, 717, 720, 73/721, 723, 727

[56] References Cited

U.S. PATENT DOCUMENTS

| | | | |
|---|---|---|---|
| 4,797,007 | 1/1989 | Elmore, III | 374/143 |
| 4,914,954 | 4/1990 | Zlamal | 73/756 |
| 5,386,730 | 2/1995 | Ikeda et al. | 73/706 |
| 5,661,244 | 8/1997 | Nishimura et al. | 73/706 |

OTHER PUBLICATIONS

"Multi–point Injection by Volkswagen", p. 102 (1996).

*Primary Examiner*—Benjamin R. Fuller
*Assistant Examiner*—Abdullahi Aw-Musse
*Attorney, Agent, or Firm*—Sughrue, Mion, Zinn, Macpeak & Seas, PLLC

[57] ABSTRACT

A pressure sensor device prevents foreign matters from reaching a pressure sensor at the back of a pressure introducing passage, is superior in resistance against both fouling and freezing, and includes a temperature sensor. The pressure sensor device comprises a pressure sensor including a pressure detecting element is disposed to define an enclosed reference chamber and an enclosed pressure introducing chamber and is deformed depending on a pressure difference between the reference chamber and the pressure introducing chamber for detecting the pressure of an object to be measured, a pipe connected to the pressure introducing chamber, and a lead-out portion; a temperature sensor including a heat sensitive element for detecting the temperature of the measured object and a lead-out portion; and a sensor container containing the pressure sensor and the temperature sensor therein and including a pressure introducing passage formed therein which has one end air-tightly connected to the pipe and the other end being open to the exterior, and also has a labyrinth structure, the sensor container including a temperature sensor containing projection formed to accommodate the heat sensitive element embedded in its distal end portion.

19 Claims, 5 Drawing Sheets

PRESSURE SENSOR DEVICE

BACKGROUND OF THE INVENTION

1. Field of the Invention

The present invention relates to a pressure sensor device for detecting the pressure of an object to be measured, and more particularly to a pressure sensor device which is directly attached to an engine intake system in use. The pressure sensor device is superior in resistance against both fouling and freezing, and has high reliability. The present invention also relates to a pressure sensor device combined with a temperature sensor for also detecting the temperature of the measured object.

2. Description of the Related Art

Figure 8:
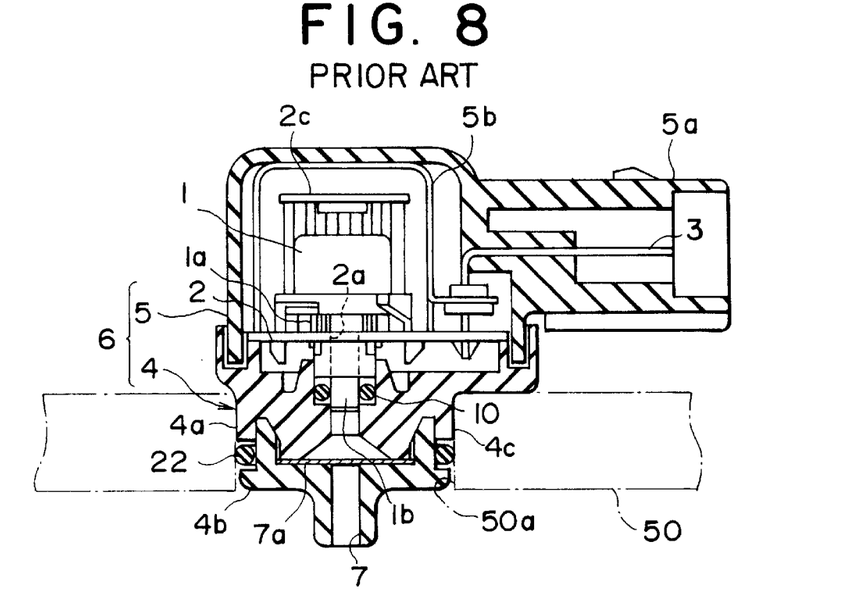
FIG. 8 is a sectional view of a conventional pressure sensor device.

FIG. 8 is a sectional view of a conventional pressure sensor device disclosed in, e.g., Japanese Unexamined Patent Publication No. 6-281519. In FIG. 8, a pressure sensor 1 is mounted on a circuit board 2 such that a lead 1a projecting from one side of the pressure sensor 1 to serve as a lead-out portion is soldered to the circuit board 2. A reference chamber (not shown) is air-tightly formed inside the pressure sensor 1. A pressure detecting element (not shown) which also air-tightly forms a pressure introducing chamber is disposed in the reference chamber. A pipe 1b extending out of the pressure sensor 1 is connected to the pressure introducing chamber. The pipe 1b introduces the pressure of an object to be measured, e.g., air, to the pressure introducing chamber. The pressure detecting element is deformed depending on a pressure difference between the pressure introducing chamber and the reference chamber. An amount of the resulting deformation is converted into an electrical signal indicating the pressure of the measured object and then output to the exterior through the lead 1a.

The pressure sensor 1 is mounted on the circuit board 2 with the pipe 1b penetrating a through hole 2a bored in the circuit board 2. Above the circuit board 2, there is another ceramic circuit board 2c being U-shaped in section and disposed to cover the pressure sensor 1. Terminals 3 for delivering an output signal of the pressure sensor 1 to the exterior are extended from one end of the circuit board 2. An assembly of the circuit board 2 and the pressure sensor 1 is placed on a base 4 with an outer peripheral portion of the circuit board 2 supported by the base 4, and is further covered by a resin-made, box-shaped housing 5. Both the base 4 and the housing 5 jointly constitute a sensor container 6 for containing the above assembly.

The pressure sensor 1 and the ceramic circuit board 2c are installed in a space defined by the base 4 and the housing 5, i.e., an inner space of the sensor container 6, in such a state as not contacting the container. Between the housing 5 and the ceramic circuit board 2c, a box-shaped cover 5b is disposed so as to cover the ceramic circuit board 2c. A peripheral edge of the cover 5b is entirely brought into abutment with the outer peripheral portion of the circuit board 2, while a top portion of the cover 5b on the opposite side is brought into abutment with an inner wall of the housing 5, thereby pressing the circuit board 2 to the base 4 from above for positioning of the circuit board 2.

A connector portion 5a for connection to an external connector (not shown) is formed at one side of the housing 5. The terminals 3 are embedded and supported in the center of the connector portion 5a. A pressure introducing passage 7 is formed through the base 4 and connected to the pipe 1b. A filter 7a is disposed near the middle of the pressure introducing passage 7. To grip the filter 7a from both sides, the base 4 is divided into two members 4a, 4b in the axial direction of the pressure introducing passage 7 (in the vertical direction in FIG. 8). The members 4a, 4b support the filter 7a in place by gripping it from above and below. A portion of the pressure introducing passage 7 formed in the member 4a on the side facing the filter 7a is flared into a conical shape for the purpose of enabling the measured object to pass the filter 7a in a sufficient amount. The pressure introducing passage 7 is air-tightly connected to the pipe 1b with an O-ring 10 fitted over the pipe 1b.

An attachment surface 4c is formed along an outer peripheral portion of the base 4, and the pressure sensor device is supported at the attachment surface 4c when it is attached in a predetermined place. An O-ring 22 is fitted over the attachment surface 4c along its outer peripheral edge.

The conventional pressure sensor device having the above-explained structure is attached to an attachment hole 50a bored in a wall of an engine intake system 50, for example, such that the base 4 is inserted in the attachment hole 50a, the attachment surface 4c is engaged with a peripheral edge of the attachment hole 50a, and the boundary between the attachment surface 4c and attachment hole 50a is sealed by the O-ring 22. After being thus attached, the pressure sensor device measures the pressure in the engine intake system.

The filter 7a is disposed, as necessary, to prevent foreign matters from entering the pressure sensor 1. Because the provision of the filter 7a increases the number of parts and makes the structure more complicated, however, there are also many pressure sensor devices of this type not including the filter 7a. In the pressure sensor device without the filter 7a, the base 4 is not divided into two members and the pressure introducing passage 7 has a cylindrical shape extending linearly.

Figure 9:
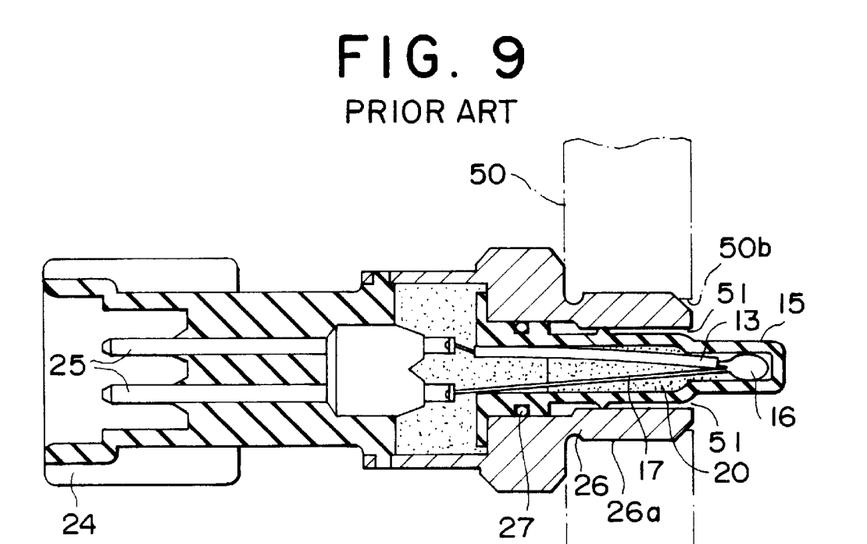
FIG. 9 is a view showing the structure of a conventional temperature sensor device.

Further, FIG. 9 is a view showing the structure of a conventional temperature sensor device disclosed in, e.g., Japanese Unexamined Utility Model Publication No. 4-30448. In FIG. 9, a thermistor 16 as a heat sensitive element is contained in a holder 15 and sealed by a resin 20 filling the surrounding of the thermistor 16. Two lead wires 17, 17 are connected to the thermistor 16, and one lead wire 17 is covered by a tube 13 for insulating the lead wires 17, 17 from each other. The temperature signal detected by the thermistor 16 is output to the exterior from terminals 25 embedded in a connector 24. A housing 26 supports the holder 15 and the connector 24, and has a threaded portion 26a formed in its outer peripheral surface for attachment of the temperature sensor device to a predetermined position. Between the housing 26 and the holder 15, an O-ring 27 is disposed to seal an object to be measured from the open air.

The conventional temperature sensor device having the above-explained structure is attached to an attachment hole 50b bored in a wall of an engine intake system 50, for example, such that the threaded portion 26a formed in the outer peripheral surface of the housing 26 is fastened into the attachment hole 50b to close it. After being thus attached, the temperature sensor device detects the temperature of the measured object.

Because the conventional pressure sensor device and temperature sensor device are constructed as explained above, separate sensor devices have been necessary to detect the pressure and temperature of the measured object. This has resulted in the problems of requiring individual attachment of the separate sensor devices to the engine intake system 50, for example, to the respective attachment holes 50a, 50b, as well as requiring external connectors and connecting wires specific to the separate sensor devices for supplying electrical power and outputting signals. In addition, external covering parts and internal constituent parts are also required for each of the separate sensor devices. It has been, therefore, difficult to manufacture the separate sensor devices cost-effectively in total.

In the conventional pressure sensor device having the structure shown in FIG. 8, as stated above, the pressure sensor device is attached to the attachment hole 50a bored in the wall of the engine intake system 50, for example, so as to close it. Meanwhile, it is generally known that the pressure in the engine intake system 50 is abruptly changed upon pressure pulsation and quick opening/closing of a throttle. When the pressure is changed from negative pressure to atmospheric pressure or positive pressure, solid foreign matters present in a pressure source are forced to fly toward the lower pressure side at high speeds. The solid foreign matters having thus flied and come to the pressure sensor device may enter the interior of the pressure sensor device in some cases. In the conventional pressure sensor device having the structure shown in FIG. 8, however, the pressure introducing passage 7 formed in the base 4 extends linearly in alignment with the axis of the pipe 1b. This has raised a problem that, for the pressure sensor device of the type not having the filter 7a, the solid foreign matters possibly reach the pressure detecting element disposed at the back of the pressure introducing passage 7 without attenuation of their kinetic energy and damage the pressure detecting element to such an extent as to make it no longer operate.

Also, in the conventional pressure sensor device having the structure shown in FIG. 8, if the pressure introducing passage 7 is attached in a horizontal state, for example, water droplets stagnate in the conical portion of the pressure introducing passage 7 facing the filter 7a. The presence of water droplets in the pressure introducing passage 7 may causes a failure in pressure sensing operation because the pressure introducing passage 7 is closed due to, e.g., freezing of the water droplets. For that reason, the conventional pressure sensor device has been avoided from being attached in an inclined mount place or the like, and is generally attached in such a state that the pressure introducing passage 7 extends vertically.

Another problem in the conventional pressure sensor device having the above-explained structure is that because of the pressure introducing passage 7 having only one opening, if the opening is closed due to freezing of water droplets or adhesion of a highly viscous material, no pressure introducing passage exists and a failure in pressure sensing operation results.

Furthermore, when measuring an object having high moisture, if the temperature surrounding the pressure sensor device is lowered, water vapor residing in the pressure introducing passage 7 and the pipe 1b is cooled so as to cause dew condensation on inner wall surfaces. At this time, the dew condensation occurs in a place where the temperature of the wall surface is lowest. Because the pipe 1b of the pressure sensor 1 is made of metal and has smaller specific heat than the base 4 made of resin, the temperature of the pipe 1b lowers more quickly than that of the base 4. Accordingly, the dew condensation occurs on the surface of the pipe 1b ranging from its inner wall to extremity. This has raised a problem that water droplets generated from the dew condensation are frozen and a failure in pressure sensing operation results.

In the conventional temperature sensor device having the structure shown in FIG. 9, a gap 51 is left between the threaded portion 26a contacting the attachment hole 50b and the holder 15 to prevent the temperature of the intake system 50 from being transmitted to the thermistor 16. But that structure is complicated and has been the cause of pushing up the cost. Furthermore, heat is transmitted to the holder 15 and the resin 20 and then finally reaches the thermistor 16; thus, the above structure has not been complete in preventing transmission of heat.

SUMMARY OF THE INVENTION

The present invention has been made with a view of solving the problems set forth above, and its object is to provide a pressure sensor device which can reduce the number of places required for mounting necessary sensor devices, which can prevent foreign matters from reaching a pressure sensor at the back of a pressure introducing passage, which can improve the degree of freedom in design of a mount position, which is superior in resistance against both fouling and freezing, and which includes a temperature sensor capable of precisely measuring the temperature of an object to be measured in the vicinity of a pressure measuring position.

A pressure sensor device according to a first aspect of the present invention comprises: a pressure sensor including a pressure detecting element which is disposed to define an enclosed reference chamber and an enclosed pressure introducing chamber and is deformed depending on a pressure difference between the reference chamber and the pressure introducing chamber for detecting the pressure of an external object to be measured, a pipe connected to the pressure introducing chamber for introducing the measured object to the pressure introducing chamber, and a lead-out portion for outputting a value detected by the pressure detecting element to the exterior; a temperature sensor disposed adjacent the pressure sensor and including a heat sensitive element for detecting the temperature of the measured object and a lead-out portion extended from the heat sensitive element for outputting a value detected by the heat sensitive element to the exterior; and a sensor container containing the pressure sensor and the temperature sensor therein and including a pressure introducing passage formed therein which has one end air-tightly connected to the pipe and the other end open to the exterior so that the pressure of the measured object can be transmitted to the pressure sensor, and containing a labyrinth structure capable of preventing intrusion of foreign matters into the pressure sensor, the sensor container including a temperature sensor containing projection formed to project from the vicinity of the opening at the other end of the pressure introducing passage with the heat sensitive element embedded in a distal end portion of the temperature sensor containing projection.

A pressure sensor device according to a second aspect comprises: a pressure sensor including an enclosed reference chamber, a pressure detecting element which defines an enclosed pressure introducing chamber inside the reference chamber and which is deformed depending on a pressure difference between the reference chamber and the pressure introducing chamber for detecting the pressure of an external object to be measured, a pipe connected to the pressure introducing chamber for introducing the measured object to the pressure introducing chamber, and a lead-out portion for outputting a value detected by the pressure detecting element to the exterior; and a sensor container containing the pressure sensor therein and including a pressure introducing passage formed therein which has one end air-tightly connected to the pipe and the other end open to the exterior so that the pressure of the measured object can be transmitted to the pressure sensor, and containing a labyrinth structure capable of preventing intrusion of foreign matters into the pressure sensor.

In a pressure sensor device according to a third aspect, the labyrinth structure is made up of a cylindrical sub-chamber having one end air-tightly connected to the pipe and the other end given by a bottom portion, and a small passage formed by boring part of the bottom portion corresponding to a maximum inner diameter such that the sub-chamber is open to the exterior through the small passage and an opening of the small passage made open to the exterior is positioned radially outward of an inner wall of the sub-chamber.

In a pressure sensor device according to a fourth aspect, the small passage is formed in plural number with intervals in the circumferential direction.

In a pressure sensor device according to a fifth aspect, the bottom portion has a generally conical shape with a raised central area.

In a pressure sensor device according to a sixth aspect, the subchamber has a volume not less than 0.2 cm$^3$ and the small passage has a sectional area not more than 0.1 cm$^2$.

A pressure sensor device according to a seventh aspect further comprises a protective plate disposed between the sub-chamber and the pipe, and includes through holes bored in the primary surface of the protective plate and shield portions formed to cover the through holes while leaving a predetermined distance between the shield portions and the primary surface, whereby the measured object passes the through holes after going around the shield portions.

In a pressure sensor device according to an eighth aspect, the protective plate is made of a material having smaller specific heat than that of the sensor container.

In a pressure sensor device according to a ninth aspect, a piece of unwoven cloth impregnated with oil or grease is put between the primary surface of the protective plate and the shield portions so as to cover the through holes.

In a pressure sensor device according to a tenth aspect, a metal mesh filter is put between the primary surface of the protective plate and the shield portions so as to cover the through holes.

In a pressure sensor device according to an eleventh aspect, the sensor container is attached to an attachment hole bored in a wall of a system, in which the measured object is present, such that an attachment surface formed along an outer peripheral portion of the sensor container is air-tightly engaged with an inner surface of the attachment holes. The temperature sensor containing projection is projected with the bottom portion thereof extending to the interior of the system and includes a bottom-equipped tubular portion accommodating the heat sensitive element in its distal end portion and a resin having high thermal conductivity and filled around the heat sensitive element, with an air layer formed between the resin and the attachment surface.

In a pressure sensor device according to a twelfth aspect, a circuit board is disposed in the sensor container and the temperature sensor is electrically connected to the circuit board through a flexible board.

DESCRIPTION OF THE PREFERRED EMBODIMENTS

Embodiment 1.

Figure 1:
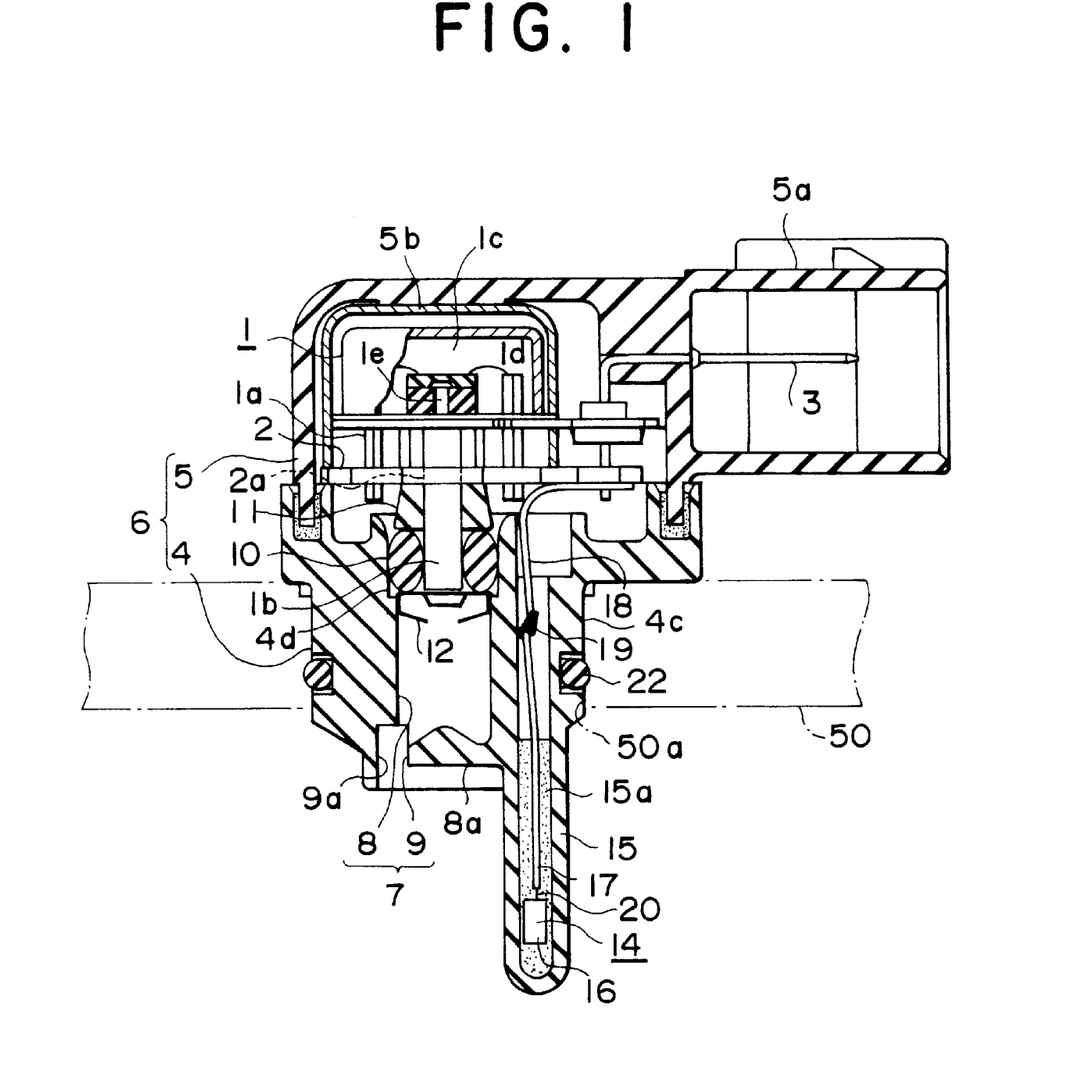
FIG. 1 is a sectional view of one embodiment of a pressure sensor device of the present invention.
Figure 2:
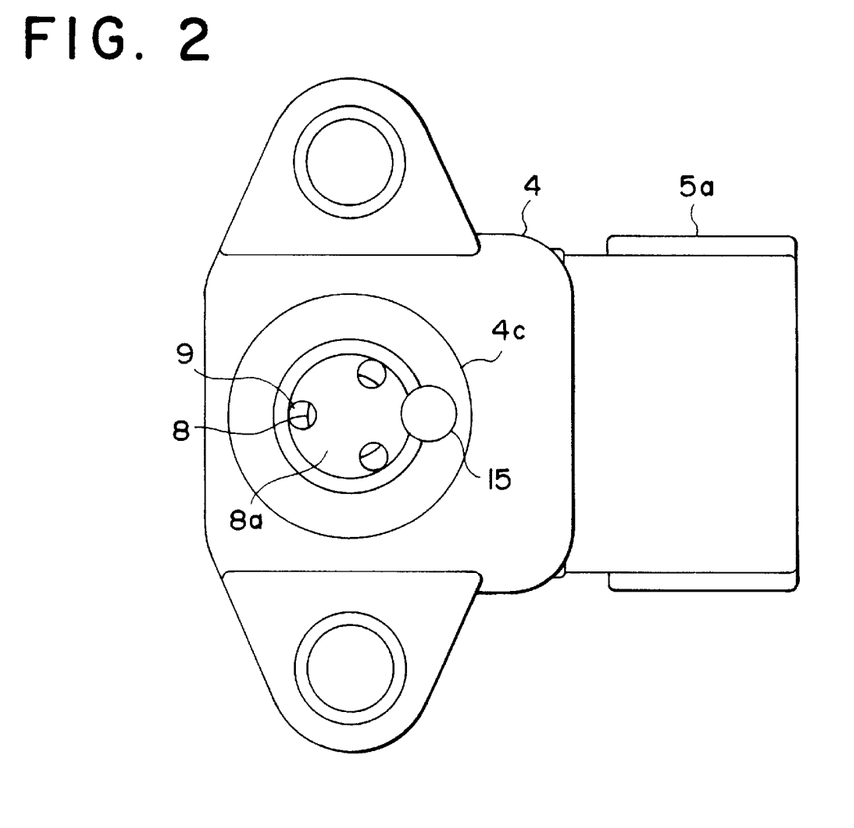
FIG. 2 is a rear view of the pressure sensor device.
Figure 3:
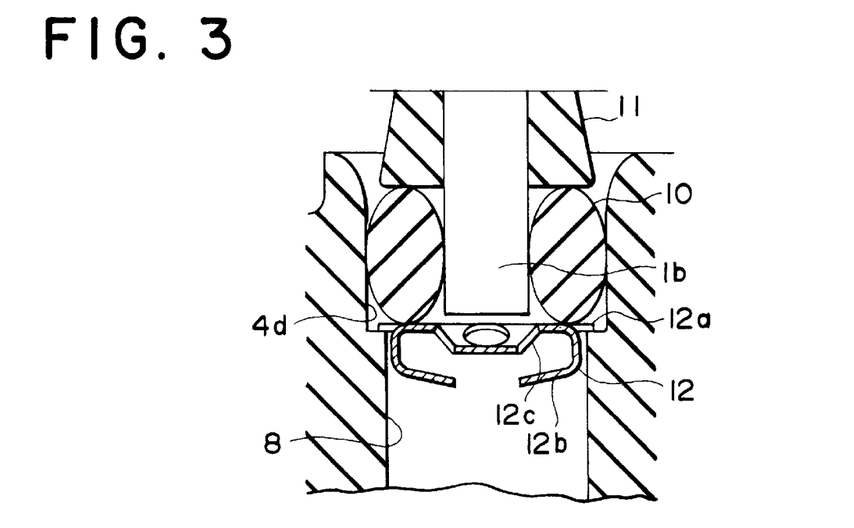
FIG. 3 is partial enlarged view of the vicinity of a protective plate.
Figure 4:
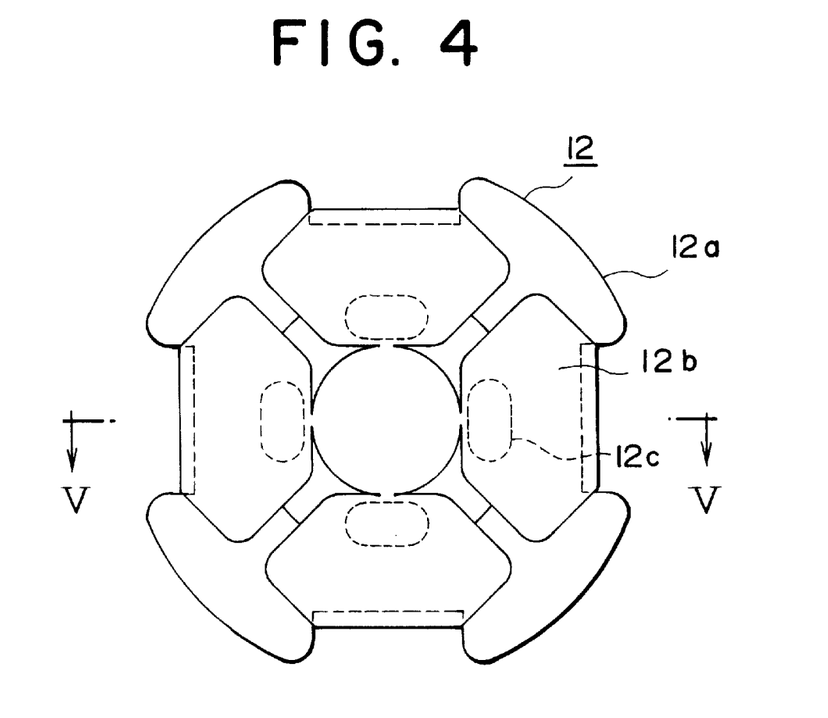
FIG. 4 is a front view of the protective plate.
Figure 5:
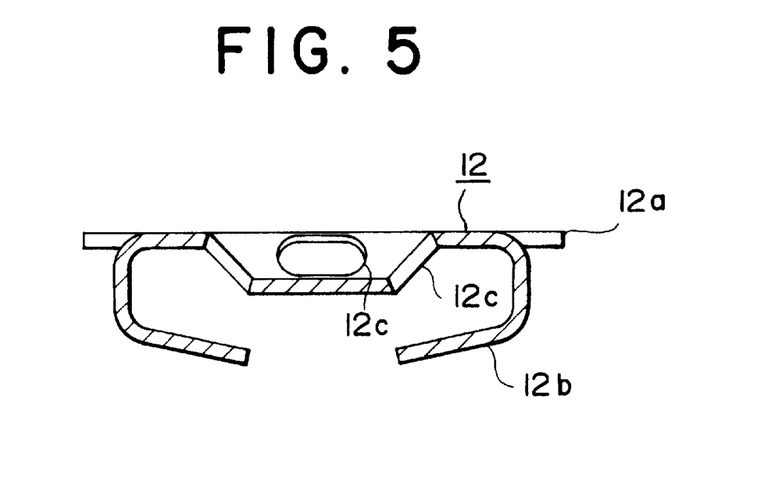
FIG. 5 is a sectional view taken along line V—V in FIG. 4, looking in the direction of the arrows.

FIG. 1 is a sectional view of one embodiment of a pressure sensor device of the present invention. FIG. 2 is a rear view of the pressure sensor device. FIG. 3 is partial enlarged view of the vicinity of a protective plate. FIG. 4 is a front view of the protective plate. FIG. 5 is a sectional view taken along line V—V in FIG. 4, looking in the direction of the arrows. In FIG. 1, a pressure sensor 1 is mounted on a circuit board 2 such that a lead 1a projects from one side of the pressure sensor 1 and serves as a lead-out portion soldered to the circuit board 2. A reference chamber 1c is air-tightly formed inside the pressure sensor 1. At the center of the reference chamber 1c, a silicon-molded, box-shaped pressure detecting element 1d is fixedly disposed while being air-tightly sealed at its peripheral edge. An air-tight pressure introducing chamber 1e is formed inside the pressure detecting element 1d. The pressure detecting element 1d includes a diaphragm portion formed by thinning part of a wall, with a gauge resistor formed on the diaphragm portion. A pipe 1b extending out of the pressure sensor 1 is connected to the pressure introducing chamber 1e. The pipe 1b introduces the pressure of an object to be measured, e.g., air, to the pressure introducing chamber 1e. The diaphragm portion of the pressure detecting element 1d is deformed depending on a pressure difference between the pressure introducing chamber 1e and the reference chamber 1c. An amount of the resulting deformation is proportional to the pressure of the measured object. The gauge resistor changes its resistance value upon the deformation of the diaphragm portion, and outputs a voltage value in proportion to the resulting resistance value, as the pressure of the measured object, to the exterior through the lead 1a.

The pressure sensor 1 is mounted on the circuit board 2 with the pipe 1b penetrating a through hole 2a bored in the circuit board 2. Terminals 3 for delivering an output signal of the pressure sensor 1 to the exterior are extended from one end of the circuit board 2. An assembly of the circuit board 2 and the pressure sensor 1 is placed on a base 4 with an outer peripheral portion of the circuit board 2 supported by the base 4, and is further covered by a resin-made, box-shaped housing 5. A peripheral edge of the housing 5 is bonded to the base 4. Both the base 4 and the housing 5 jointly constitute a sensor container 6 for containing the above assembly. The pressure sensor 1 is installed in a space defined inside the sensor container 6 in such a state as not contacting the container. Between the housing 5 and the pressure sensor 1, a box-shaped cover 5b is disposed so as to cover the pressure sensor 1. A peripheral edge of the cover 5b is entirely brought into abutment with the outer peripheral portion of the circuit board 2, while a top portion of the cover 5b on the opposite side is brought into abutment with an inner wall of the housing 5, thereby pressing the circuit board 2 to the base 4 from above, as shown in FIG. 1, for positioning of the circuit board 2.

A connector portion 5a for connection to an external connector (not shown) is formed at one side of the housing 5. A plurality of terminals 3 are embedded and supported in the center of the connector portion 5a.

A pressure introducing passage 7 connected to the pipe 1b for introducing the pressure of the measured object to the pipe 1b is formed through the base 4. The pressure introducing passage 7 has a labyrinth structure made up of a sub-chamber 8 and a small passage 9. The sub-chamber 8 is a cylindrical space having one end air-tightly connected to the side of the pipe 1b and the other end given by a bottom portion 8a. The small passage 9 is a passage formed by boring the outermost part of the bottom portion 8a, i.e., part of the bottom portion 8a corresponding to a maximum inner diameter of the sub-chamber 8, such that the sub-chamber 8 is made open to the exterior, and its opening 9a made open to the exterior is positioned radially outward of an inner wall of the sub-chamber 8. The bottom portion 8a is located on the axis of the pipe 1b and has a generally conical shape with its central area raised into the sub-chamber 8.

The measured object passing through the pressure introducing passage 7 advances through the small passage 9, then reaches the sub-chamber 8 after changing direction, and then enters the pipe 1b. On the other hand, solid foreign matters flying toward the pressure sensor device at high speeds strike against the bottom portion 8a, or are attenuated in kinetic energy while passing a portion connecting the small passage 9 and the sub-chamber 8 even if they enter the pressure introducing passage 7 through the small passage 9. Accordingly, no solid foreign matters are able to reach the pressure sensor 1. Stated otherwise, the sub-chamber 8 and the small passage 9 cooperate to construct the labyrinth structure function, to introduce the measured object to the pressure sensor 1 through a roundabout way for transmitting the pressure of the measured object to the pressure sensor 1, and to attenuate the kinetic energy of the solid foreign matters having flied and come to the pressure sensor device at high speeds, thereby preventing the foreign matters from entering the pressure sensor 1.

The pressure introducing passage 7 is air-tightly connected to the pipe 1b with an O-ring 10 fitted over the pipe 1b. The O-ring 10 is positioned by a holder 11 disposed between the O-ring 10 and the circuit board 2. Also, a protective plate 12 having through holes which are even smaller than the small passage 9, is disposed between the sub-chamber 8 and the pipe 1b so that the measured object is introduced to the pressure sensor 1 through a further roundabout way. The protective plate 12 will be described later in detail.

The base 4 includes a temperature sensor containing projection 15 formed adjacent the pressure introducing passage 7 and extending downward, as shown in FIG. 1. In the interior of the temperature sensor containing projection 15, a deep hole is bored to extend from above along the axis of the projection 15 in the direction parallel to the pressure introducing passage 7, thereby providing a hollow portion 15a. The hollow portion 15a is formed by cutting the interior of the temperature sensor containing projection 15 such that a side wall and a bottom wall each have a predetermined thickness.

A temperature sensor 14 is installed in the hollow portion 15a. The temperature sensor 14 comprises a thermistor 16, i.e., a heat sensitive element, disposed near the bottom of the hollow portion 15a, and lead wires 17, i.e., a lead-out portion, extending from the thermistor 16. The thermistor 16 senses the temperature of the measured object through the side wall of the temperature sensor containing projection 15, converts the sensed temperature into an electrical signal, and then outputs it to the exterior. To position the temperature sensor 14 in place, a resin 20 having high thermal conductivity, such as silicone rubber, silicone grease and silicone compound, is filled in the hollow portion 15a. Note that the resin 20 is filled only in an area of the hollow portion 15a near its tip, and not filled in an area thereof near an attachment surface 4c described later.

Ends of the lead wires 17 are connected to one end of a flexible board 18 by a solder 19. The flexible board 18 is bent substantially at a right angle and has the other end fixed to the circuit board 2 for electrical connection to the terminals 3 extending from the circuit board 2. The temperature detected by the thermistor 16 is converted into an electrical signal and then output to the exterior through the lead wires 17, the flexible board 18, the circuit board 2 and the terminals 3.

In the assembly process of the pressure sensor device, the ends of the lead wires 17 are first soldered to one end of the flexible board 18, then the other end of the flexible board 18 is soldered to the circuit board 2, and thereafter the temperature sensor 14 is inserted into the hollow portion 15a when the circuit board 2 is placed on the base 4. At this time, since the flexible board 18 is susceptible to bending, the temperature sensor 14 can be easily inserted into the hollow portion 15a and the efficiency of assembly is high.

The attachment surface 4c is formed along an outer peripheral portion of the base 4. An O-ring 22 is disposed to fit over the attachment surface 4c in the circumferential direction. The pressure sensor device is attached to an attachment hole 50a bored in a wall of an engine intake system 50 such that its portion below the O-ring 22 is inserted in and projected out of the attachment hole 50a downward and sealed by the O-ring 22.

Referring to FIG. 2, three small passages 9 are formed in respective parts of the bottom portion 8a corresponding to the maximum inner diameter of the sub-chamber 8 with equal intervals therebetween in the circumferential direction. Referring to FIG. 3, the O-ring 10 is installed in an O-ring containing portion 4d formed coaxially with the sub-chamber 8. Between the O-ring containing portion 4d and the sub-chamber 8, a step is formed to extend in the circumferential direction. On the other hand, the protective plate 12 is positioned by being pressed by the O-ring 10 from above, as shown in FIG. 3, while an ear portion 12a formed along an outer periphery of the protective plate 12 is engaged with the step.

Referring to FIGS. 4 and 5, the protective plate 12 is made of a metal having smaller specific heat than the sensor container 6, and is formed by bending four corners of a rectangular plate material inward which has been punched by a press inward, for example. Four through holes 12c are bored in a central portion of the primary surface of the protective plate 12 with equal angular intervals therebetween at a predetermined distance from the center of the protective plate 12. Shield portions 12b formed by bending the four corners are positioned to cover the four through holes 12c bored in the central portion, respectively, while leaving a predetermined distance between the shield portions 12b and the through holes 12c. The through holes 12c each have a smaller diameter than the small passages 9. The measured object passes the protective plate 12 when going from the sub-chamber 8 to the pipe 1b. At this time, the measured object goes around the shield portions 12b, passes the through holes 12c, and then advances to the pipe 1b after changing direction. In other words, the sub-chamber 8 not only cooperates with the small passages 9 to construct the labyrinth structure, but also includes the protective plate 12 disposed therein to construct a more complex labyrinth structure, thus making it harder for the foreign matter to enter the pressure sensor.

The pressure sensor device having the above-explained structure is attached to the attachment hole 50a, which is bored in the wall of the engine intake system 50, and sealed by the O-ring 22. After being thus attached, the pressure sensor 1 detects the pressure of the measured object and the temperature sensor 14 detects the temperature of the measured object in the vicinity of the pressure detecting position.

In the pressure sensor device of this embodiment, the volume of the sub-chamber 8 is 0.2 cm$^3$ and the sectional area of each small passage 9 is 0.1 cm$^2$. Regarding the shape of the pressure introducing passage 7, it has been found, as a result from conducting experiments on a variety of modified shapes, that an effect of fluctuations in external pressure is reduced when a sub-chamber having a volume not less than a certain value is formed midway along the pressure introducing passage. More specifically, the pressure sensor device of this embodiment was attached to a surge tank as a merged portion of the engine intake pipes, and experiments were conducted while modifying shapes of the pressure introducing passage 7 such that the volume of the sub-chamber 8 and the sectional area of the small passage 9 had various values. As a result, high-frequency pressure pulsation in excess of 1 KHz was removed when the pressure introducing passage 7 was constructed with the sub-chamber 8 having a volume not less than 0.2 cm$^3$ and the small passage 9 having a sectional area not more than 0.1 cm$^2$. Removal of high-frequency pressure pulsation on such an order means that even if foreign matters enter the sub-chamber 8, their kinetic energy is so reduced that it is very hard for the foreign matters to reach the pressure sensor 1.

With the pressure sensor device having the above-explained construction, the pressure introducing passage 7 has the labyrinth structure made up of the cylindrical sub-chamber 8 having one end air-tightly connected to the pipe 1b and the other end given by the bottom portion 8a, the small passage 9 formed by boring the part of the bottom portion 8a corresponding to the maximum inner diameter of the sub-chamber 8 and disposed to connect the sub-chamber 8 with the exterior, with the protective plate 12 disposed between the sub-chamber 8 and the pipe 1b and having the through holes 12c smaller than the small passage 9. Accordingly, foreign matters rarely reach the pressure sensor 1, and the pressure sensor device can have high reliability.

Also, the small passage 9 is formed by boring the part of the bottom portion 8a corresponding to the maximum inner diameter of the sub-chamber 8 and its opening 9a made open to the exterior is positioned radially outward of the inner wall of the sub-chamber 8. Even with the pressure introducing passage 7 attached in a somewhat inclined state, therefore, it is difficult for a liquid to stagnate in the pressure introducing passage 7 and the degree of freedom in direction of attachment of the pressure sensor device is increased. Additionally, even if the pressure introducing passage 7 is attached in a state inclined 90 degrees at maximum, a liquid can be easily discharged because there is no place allowing the liquid to stagnate in the pressure introducing passage 7 with the small passage 9 is positioned radially outward of the inner wall of the sub-chamber 8. As a result, a failure in the pressure sensing operation due to freezing of the liquid is avoided and reliability is improved.

Further, the small passage 9 is formed in plural number in the respective parts of the bottom portion 8a corresponding to the maximum inner diameter of the sub-chamber 8 with equal angular intervals in the circumferential direction. Accordingly, even if one of the small passages 9 is closed, upon freezing of the liquid or by a highly viscous material such as grease, pressure can be transmitted so long as the other small passages 9 are not closed. A pressure sensor having even higher reliability can be thus achieved.

Moreover, since the sub-chamber 8 has a volume not less than 0.2 cm$^3$ and the small passage 9 has a sectional area not more than 0.1 cm$^2$, high-frequency pressure pulsation in excess of 1 KHz can be removed. Even if foreign matters enter the sub-chamber, their kinetic energy is reduced and a highly reliable pressure sensor can be achieved.

In addition, the protective plate 12 is made of a material having smaller specific heat than that of the sensor container 6. Accordingly, when water vapor in the pressure introducing passage 7 is cooled, dew condensation occurs first on the protective plate 12. Then, dew condensation spreads all over the protective plate 12 in a small amount at each of dispersed points. This means that even if water droplets generated from the dew condensation are frozen, the through holes 12c are not easily closed. As a result, the pressure introducing passage is not so easily closed and reliability is much improved, as compared with the case where dew condensation occurring in the pipe 1b of the sensor 1 would close the pipe 1b upon freezing.

Also, the resin 20 is filled only in the area of the hollow portion 15a near its tip, and not filled in an area thereof near the attachment surface 4c. An air layer is therefore formed between the resin 20 and the attachment surface 4c. The air layer has thermal conductivity that is about 1/10 that for the resin material of the base 4. Accordingly, heat at the attachment hole 50a of the intake system 50 is transmitted much less to the thermistor 16 from the base 4, enabling the thermistor 16 to precisely measure the temperature of the measured object.

Further, the temperature sensor 14 is electrically connected to the circuit board 2 through the flexible board 18. Accordingly, when the temperature sensor 14 is inserted into the hollow portion 15a in the assembly process of the pressure sensor device, the flexible board 18 is susceptible to bending and the temperature sensor 14 can be easily inserted into the hollow portion 15a, thus resulting in high efficiency of assembly.

Embodiment 2.

Figure 6:
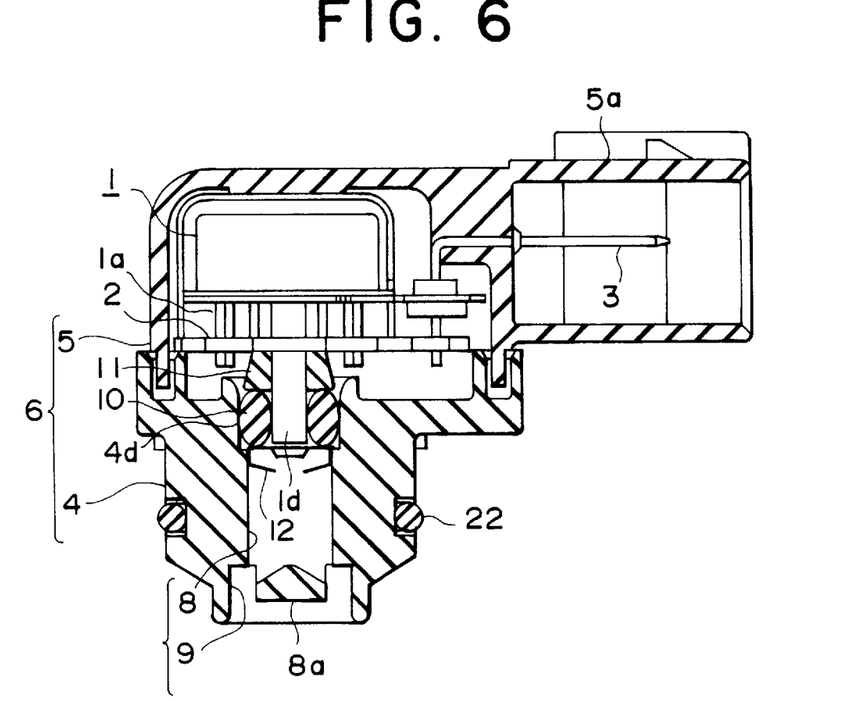
FIG. 6 is a sectional view of another embodiment of the pressure sensor device of the present invention.

FIG. 6 is a sectional view of another embodiment of the pressure sensor device of the present invention. In this embodiment, the temperature sensor 14 and its surrounding portions are omitted from the pressure sensor device of the Embodiment 1. The small passage 9 is formed twice, at diametrically opposing positions in respective parts of the bottom portion 8a corresponding to the maximum inner diameter of the sub-chamber 8. The other construction is the same as in the Embodiment 1.

The pressure sensor device of this embodiment thus modified in construction can also provide essentially the same advantages as obtainable with the pressure sensor 1 of the Embodiment 1.

Embodiment 3.

Figure 7:
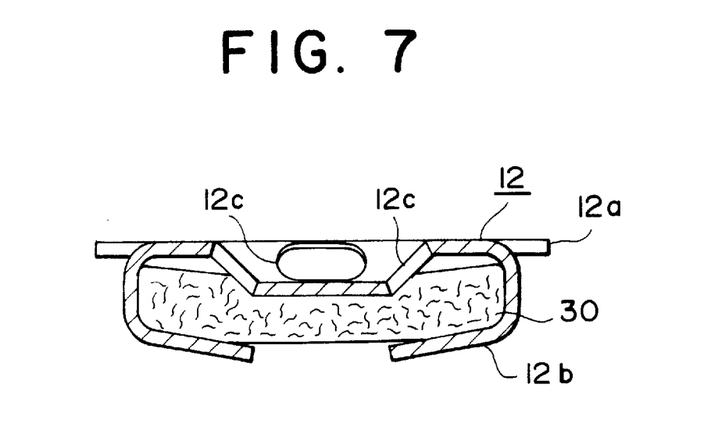
FIG. 7 is a sectional view of a protective plate, showing still another embodiment of the pressure sensor device of the present invention.

FIG. 7 is a sectional view of a protective plate, showing still another embodiment of the pressure sensor device of the present invention. The pressure sensor device of this embodiment has a protective plate 12 similar to that in the Embodiment 1, but a piece of unwoven cloth 30 impregnated with oil or grease, such as silicone oil, is put in the protective plate 12. The piece of unwoven cloth 30 is arranged so as to cover the through holes 12c.

The pressure sensor device of this embodiment thus modified in construction can prevent even smaller foreign matters from entering the pressure sensor 1. In addition, since the piece of unwoven cloth 30 is impregnated with oil or grease, such as silicone oil, and has a water repelling property, it functions to repel a liquid such as water and prevent the liquid from entering the pressure sensor 1. A pressure sensor device having even higher reliability can be thus achieved.

Note that a metal mesh filter may be put in the protective plate 12 instead of the piece of unwoven cloth 30. Using a metal mesh filter is advantageous in the viewpoint of cost effectiveness.

The present invention described above can provide advantages described below. The pressure sensor device according to the first aspect comprises: a pressure sensor including a pressure detecting element which is disposed to define an enclosed reference chamber and an enclosed pressure introducing chamber, and which is deformed depending on a pressure difference between the reference chamber and the pressure introducing chamber for detecting the pressure of an external object to be measured, a pipe connected to the pressure introducing chamber for introducing the measured object to the pressure introducing chamber, and a lead-out portion for outputting a value detected by the pressure detecting element to the exterior; a temperature sensor disposed adjacent the pressure sensor and including a heat sensitive element for detecting the temperature of the measured object, and a lead-out portion extended from the heat sensitive element for outputting a value detected by the heat sensitive element to the exterior; and a sensor container containing the pressure sensor and the temperature sensor therein and including a pressure introducing passage formed therein which has one end air-tightly connected to the pipe and the other end open to the exterior so that the pressure of the measured object can be transmitted to the pressure sensor, and also having a labyrinth structure capable of preventing intrusion of foreign matters into the pressure sensor, the sensor container including a temperature sensor containing projection formed to project from the vicinity of the opening at the other end of the pressure introducing passage, with the heat sensitive element embedded in a distal end portion of the temperature sensor containing projection. Therefore, the pressure sensor and the temperature sensor, which have been separately attached in the past, can be attached in one mount place; hence the number of places required for mounting necessary sensors can be reduced and the temperature of the pressure detecting position can be measured precisely. Further, foreign matters can be prevented from entering the pressure sensor and a highly reliable pressure sensor can be achieved.

The pressure sensor device according to the second aspect comprises: a pressure sensor including an enclosed reference chamber, a pressure detecting element which defines an enclosed pressure introducing chamber inside the reference chamber and which is deformed depending on a pressure difference between the reference chamber and the pressure introducing chamber for detecting the pressure of an external object to be measured; a pipe connected to the pressure introducing chamber for introducing the measured object to the pressure introducing chamber, and a lead-out portion for outputting a value detected by the pressure detecting element to the exterior; and a sensor container containing the pressure sensor therein and including a pressure introducing passage formed therein which has one end air-tightly connected to the pipe and the other end being open to the exterior so that the pressure of the measured object can be transmitted to the pressure sensor, and which also has a labyrinth structure capable of preventing intrusion of foreign matters into the pressure sensor. Therefore, foreign matters can be prevented from entering the pressure sensor and a highly reliable pressure sensor can be achieved.

In the pressure sensor device according to the third aspect, the labyrinth structure is made up of a cylindrical sub-chamber having one end air-tightly connected to the pipe and the other end given by a bottom portion, and a small passage formed by boring a part of the bottom portion corresponding to a maximum inner diameter such that the sub-chamber is open to the exterior through the small passage and so that an opening of the small passage made open to the exterior is positioned radially outward of an inner wall of the sub-chamber. Therefore, it is hard for a liquid to stagnate in the labyrinth and a highly reliable pressure sensor can be achieved.

In the pressure sensor device according to the fourth aspect, the small passage is formed in plural number with intervals in the circumferential direction. Therefore, even if one small passage is closed, the pressure can be still transmitted through the other small passage(s); hence a highly reliable pressure sensor can be achieved.

In the pressure sensor device according to the fifth aspect, the bottom portion has a generally conical shape with a raised central area. Therefore, it is harder for a liquid to stagnate in the labyrinth and a highly reliable pressure sensor can be achieved.

In the pressure sensor device according to the sixth aspect, the sub-chamber has a volume not less than 0.2 $cm^3$ and the small passage has a sectional area not more than 0.1 $cm^2$. Therefore, high-frequency pressure pulsation in excess of 1 KHz, that is not necessary for control, can be removed and a highly reliable pressure sensor can be achieved.

The pressure sensor device according to the seventh aspect further comprises a protective plate disposed between the sub-chamber and the pipe, and includes through holes bored in the primary surface of the protective plate and shield portions formed to cover the through holes while leaving a predetermined distance between the shield portions and the primary surface, whereby the measured object passes the through holes after going around the shield portions. Therefore, even smaller foreign matters can be prevented from entering the pressure sensor and a highly reliable pressure sensor can be achieved.

In the pressure sensor device according to the eighth aspect, the protective plate is made of a material having smaller specific heat than that of the sensor container. It is therefore possible to prevent dew condensation of water droplets within the pressure sensor and to eliminate a failure in pressure sensing operation due to clogging caused by freezing of the water droplets.

In the pressure sensor device according to the ninth aspect, a piece of unwoven cloth impregnated with oil or grease is put between the primary surface of the protective plate and the shield portions so as to cover the through holes. Therefore, even smaller foreign matters can be prevented from entering the pressure sensor. In addition, since the piece of unwoven cloth has a water repelling property, it functions to repel a liquid such as water and to prevent the liquid from entering the pressure sensor. A pressure sensor device having even higher reliability can be thus achieved.

In the pressure sensor device according to the tenth aspect, a metal mesh filter is put between the primary surface of the protective plate and the shield portions so as to cover the through holes. Therefore, even smaller foreign matters can be prevented from entering the pressure sensor with relatively lower cost.

In the pressure sensor device according to the eleventh aspect, the sensor container is attached to an attachment hole bored in a wall of a system, in which the measured object is present, such that an attachment surface formed along an outer peripheral portion of the sensor container is air-tightly engaged with an inner surface of the attachment hole. The temperature sensor containing projection is projected with the bottom portion thereof extending to the interior of the system, and includes a bottom-equipped tubular portion accommodating the heat sensitive element in its distal end portion, with a resin having high thermal conductivity filled around the heat sensitive element, and with an air layer formed between the resin and the attachment surface. Therefore, heat of the system, in which the measured object is present, transmitted through the attachment surface, is blocked off by the air layer and is not transmitted to the heat sensitive element. As a result, the temperature of the measured object can be detected precisely.

In the pressure sensor device according to the twelfth aspect, a circuit board is disposed in the sensor container and the temperature sensor is electrically connected to the circuit board through a flexible board. Therefore, the heat sensitive element can be easily inserted into the temperature sensor containing projection and efficiency of assembly can be improved.

What is claimed is:

1. A sensor device comprising:
   a pressure sensor having a pressure detecting element, a pipe, and a lead-out portion, said pressure detecting element having an enclosed reference chamber and an enclosed pressure introducing chamber, wherein said pressure detecting element is deformed depending on a pressure difference between a pressure inside said reference chamber and a pressure inside said pressure introducing chamber for detecting the pressure of an external object to be measured, and wherein said pipe is connected to said pressure introducing chamber for introducing said external object to be measured to said pressure introducing chamber, and wherein said lead-out portion outputs a value detected by said pressure detecting element;
   a temperature sensor disposed adjacent to said pressure sensor, said temperature sensor having a heat sensitive element for detecting the temperature of the measured object and a second lead-out portion extending from said beat sensitive element for outputting a value detected by said heat sensitive element; and
   a sensor container for containing said pressure sensor and said temperature sensor therein, said sensor container having a pressure introducing passage and a temperature sensor containing projection formed therein, wherein said pressure introducing passage has one end air-tightly connected to said pipe and an other end open to the exterior so that the pressure of said external object to be measured can be transmitted to said pressure sensor, and wherein said pressure introducing passage has a labyrinth structure capable of preventing intrusion of foreign material into said pressure sensor, and wherein said temperature sensor containing projection is formed to project from the vicinity of the opening at said other end of said pressure introducing passage, and wherein said heat sensitive element is embedded in a distal end portion of said temperature sensor containing projection.

2. A sensor device comprising:
   a pressure sensor having an enclosed reference chamber, a pressure detecting element which comprises an enclosed pressure introducing chamber inside said reference chamber and which is deformed depending on a pressure difference between said reference chamber and said pressure introducing chamber for detecting the pressure of an external object to be measured, a pipe connected to said pressure introducing chamber for introducing said external object to be measured to said pressure introducing chamber, and a lead-out portion for outputting a value detected by said pressure detecting element; and
   a sensor container containing said pressure sensor therein, said sensor container having a pressure introducing passage formed therein, said pressure introducing passage having one end air-tightly connected to said pipe and an other end open to the exterior so that the pressure of said external object to be measured can be transmitted to said pressure sensor, said pressure introducing passage also having a labyrinth structure capable of preventing intrusion of foreign material into said pressure sensor,
   wherein said labyrinth structure comprises a cylindrical sub-chamber having one end air-tightly connected to said pipe and an other end given by a bottom portion, and a small passage formed by boring a part of said bottom portion corresponding to a maximum inner diameter of said sub-chamber such that said sub-chamber is open to the exterior through said small passage, and wherein an opening of said small passage made open to the exterior is positioned radially outward of an inner wall of said sub-chamber.

3. A sensor device as claimed in claim 1, wherein said labyrinth structure comprises a cylindrical sub-chamber having one end air-tightly connected to said pipe and an other end given by a bottom portion, and a small passage formed by boring a part of said bottom portion corresponding to a maximum inner diameter of said sub-chamber such that said sub-chamber is open to the exterior through said small passage, and wherein an opening of said small passage made open to the exterior is positioned radially outward of an inner wall of said sub-chamber.

4. A sensor device as claimed in claim 3, wherein said small passage is formed in plural number such that said plural number of small passages are positioned at intervals in a circumferential direction around said maximum inner diameter of said sub-chamber.

5. A sensor device as claimed in claim 3, wherein said bottom portion has a generally conical shape with a raised central area.

6. A sensor device as claimed in claim 3, wherein said sub-chamber has a volume not less than 0.2 $cm^3$ and said small passage has a sectional area not more than 0.1 $cm^2$.

7. A sensor device as claimed in claim 3, further comprising a protective plate disposed between said sub-chamber and said pipe, said protective plate having through holes bored in a primary surface of said protective plate and shield portions formed to cover said through holes while leaving a predetermined distance between said shield portions and said primary surface, whereby said external object to be measured passes said through holes after going around said shield portions.

8. A sensor device as claimed in claim 7, wherein said protective plate is made of a material having a specific heat less than a specific heat of a material included in said sensor container.

9. A sensor device as claimed in claim 7, wherein a piece of unwoven cloth is disposed between said primary surface of said protective plate and said shield portions so as to cover said through holes, and wherein said piece of unwoven cloth is impregnated with at least one of oil and grease.

10. A sensor device as claimed in claim 7, wherein a metal mesh filter is disposed between said primary surface of said protective plate and said shield portions so as to cover said through holes.

11. A sensor device as claimed in claim 1, wherein said sensor container is attached to an attachment hole bored in a wall of a system such that an attachment surface formed along an outer peripheral portion of said sensor container is air-tightly engaged with an inner surface of said attachment hole, and wherein said temperature sensor containing projection is projected so that a portion thereof extends into an interior space of said system, and wherein said temperature sensor containing projection has a bottom-equipped tubular portion containing said heat sensitive element in a distal end portion, and wherein a resin having high thermal conductivity is disposed around said heat sensitive element so that an air layer is formed between said resin and said attachment surface.

12. A sensor device as claimed in claim 1, wherein a circuit board is disposed in said sensor container and wherein said temperature sensor is electrically connected to said circuit board through a flexible board.

13. A sensor device as claimed in claim 2, further comprising a protective plate disposed between said sub-chamber and said pipe, said protective plate having through holes bored in a primary surface of said protective plate and shield portions formed to cover said through holes while leaving a predetermined distance between said shield portions and said primary surface, whereby said external object to be measured passes said through holes after going around said shield portions.

14. A sensor device as claimed in claim 2, wherein said small passage is formed in plural number such that said plural number of small passages are positioned at intervals in a circumferential direction around said maximum inner diameter of said sub-chamber.

15. A sensor device as claimed in claim 2, wherein said bottom portion has a generally conical shape with a raised central area.

16. A sensor device as claimed in claim 2, wherein said sub-chamber has a volume not less than 0.2 cm$^3$ and said small passage has a sectional area not more than 0.1 cm$^2$.

17. A sensor device as claimed in claim 13, wherein a metal mesh filter is disposed between said primary surface of said protective plate and said shield portions so as to cover said through holes.

18. A sensor device as claimed in claim 13, wherein said protective plate is made of a material having a specific heat less than a specific heat of a material included in said sensor container.

19. A sensor device as claimed in claim 13, wherein a piece of unwoven cloth is disposed between said primary surface of said protective plate and said shield portions so as to cover said through holes, and wherein said piece of unwoven cloth is impregnated with at least one of oil and grease.

\* \* \* \* \*